United States Patent Office 3,356,937
Patented Dec. 5, 1967

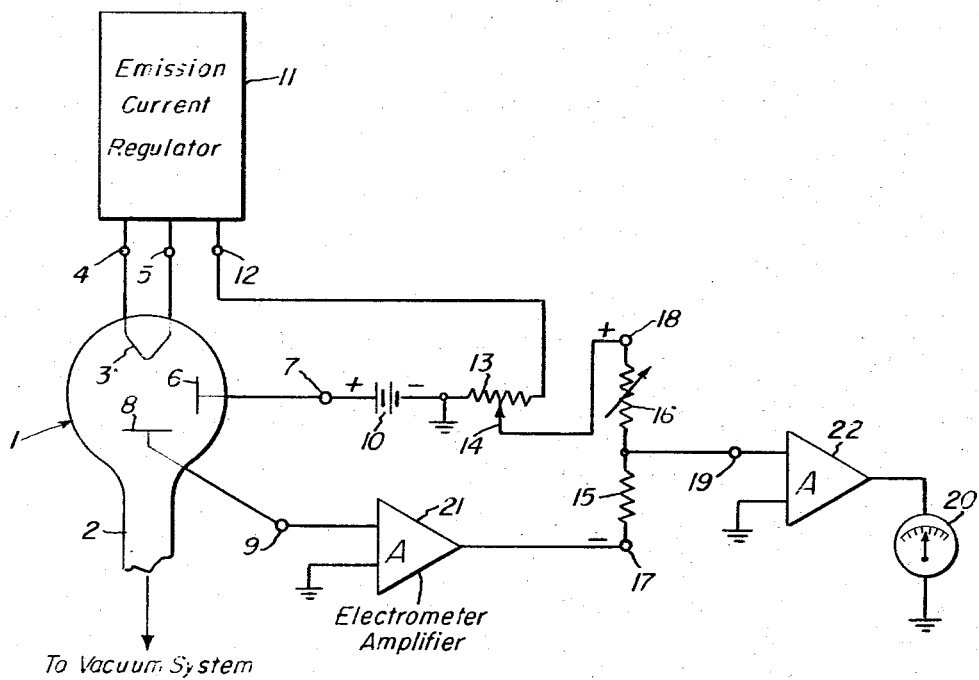

3,356,937
NULL-BALANCED COMPENSATION SYSTEM FOR ION GAUGE WITH EMISSION CURRENT INSTABILITIES
Robert L. Watters, Schenectady, N.Y., assignor to General Electric Company, a corporation of New York
Filed Sept. 28, 1964, Ser. No. 399,540
7 Claims. (Cl. 324—33)

ABSTRACT OF THE DISCLOSURE

In a system for detecting leaks in a low pressure gas-filled enclosure by ionizing a tracer gas which has entered the enclosure and measuring the change in the rate at which ionization occurs, compensation for instabilities in the rate at which electrons are emitted within an ion gauge where the ionization takes place is provided by null-balancing the rate at which ions are collected during normal nonleaky operation against the rate at which electrons are emitted, thereby eliminating emission current instabilities as a source of error in leak detection.

---

The present invention relates generally to ion gauge systems used, for example, to indicate the pressure within an evacuated enclosure or to sense the character of gases within the enclosure.

Ion gauge systems of the type to which the present invention relates utilize a thermionic electron-emissive cathode that emits electrons which ionize a gas within a low pressure gas-filled enclosure. Substantially all of the electrons emitted are collected at an electron-collecting anode and there is an ion-collecting electrode which collects an approximately constant fraction of the ions produced. The magnitude of the ion current, resulting from such ion collection, is used as an indication of the pressure of gas within the enclosure. The ion current in general decreases as pressure within the enclosure is reduced. In addition, by subjecting the external surfaces of the enclosure to a stream of gas which is more or less readily ionizable than the gas within the enclosure, leaks can be discovered and located.

While the thermionic electron-emissive, or "hot," cathode type of ion gauge system offers certain advantages of flexibility and simplicity over the known cold cathode systems in many applications, the hot cathode ion gauge has heretofore suffered one serious detriment when used for leak detection. This arises by virtue of the tendency of thermionic electron-emissive materials to provide uncontrollable and sporadic electron emission, particularly when operated at extremely low current densities as is oftentimes required in ion gauge systems.

The sporadic emission that is most troublesome is that which is known to those skilled in the art as "flicker noise" which as used herein is defined as an undesired component of an electric signal falling within the frequency spectrum of from one cycle per minute to ten cycles per second. Because such flicker noise falls within the useful range of signal frequencies detected during leak detection, it is not possible to utilize frequency selective filters to eliminate the undesired effects, as can be done with higher frequency noise, nor is it practical to compensate for such flicker noise by controlling heating of the cathode as is done to compensate for lower frequency noise, as drift. It would be highly desirable to improve the signal-to-noise ratio of ion gauge systems used for detecting leaks, with respect to flicker noise.

Accordingly, it is an object of my invention to provide an ion gauge system having improved signal-to-noise ratio.

It is another object of my invention to provide a hot cathode ion gauge system having flicker noise compensation.

Still another object of my invention is to provide a more sensitive method and apparatus for leak detection.

The features of my invention which I believe to be novel are set forth with particularity in the appended claims. My invention itself, however, both as to its organization and method of operation, together with further objects and advantages thereof, may best be understood by reference to the following description taken in connection with the accompanying drawing which is a schematic diagram of an illustrative embodiment of an ion gauge leak detection system in accord with this invention.

The ion gauge system of the present invention utilizes gas ionization detection means featuring a hot cathode. An example of such a system is the type oftentimes referred to as the Bayard-Alpert type ionization gauge, as opposed to the cold cathode types of which the Penning ionization gauge is an example.

The hot cathode gas ionization detection means is disposed within a low pressure gas-filled enclosure 1 that is normally an appendage of a vacuum system and is connected thereto by a communicating passage that can take the form of hollow neck portion 2 of enclosure 1, as illustrated. The detection means includes a plurality of externally energizable electrical elements including a thermionic electron-emissive cathode 3 having external terminals 4 and 5 electrically conductively connected thereto for the purpose of applying heating current to cathode 3 and establishing an appropriate bias potential therefor relative to the other electrodes.

The gas ionization detection means includes an electron-collecting anode 6 having an external connection 7 and an ion-collecting electrode 8 having an external electrical connection 9. A suitable bias voltage for anode 6 is provided by source 10 of electric potential, that can be a battery as schematically illustrated, having a positive terminal thereof connected to anode 6 through connection 7 and having a negative terminal thereof grounded, or returned to the point of zero reference potential for the system.

While it is required that ion-collecting electrode 8 be negatively biased with respect to cathode 3 in order to attract and collect the positive ions generated within enclosure 1, a separate bias source for ion-collecting electrode 8 is advantageously obviated in most cases by providing an emission current regulator 11 which energizes cathode 3 through electrical connections 4 and 5 and simultaneously establishes therefor a suitable positive potential with respect to ground. Such a positive bias is typically in the order from 10 to 40 volts. Of course, such a positive bias for cathode 3 requires a correspondingly larger magnitude of voltage for source 10. A typical value for the magnitude of source 10 is in the order of 150 volts.

The emission current-sensing input terminal 12 of emission current regulator 11 is connected to ground through a resistance 13, that is conveniently selected to have a variable tap 14 thereon. There is a low effective resistance electrical path within regulator 11 between terminal 12 and at least one of terminals 4 and 5 in order to provide a complete circuit for electrons emitted by cathode 3 and collected by anode 6. Sensing means within regulator 11 varies the quantity of electrical power supplied to terminals 4 and 5 inversely as changes in the magnitude of input voltage applied to terminal 12. In this way, the electron emission from cathode 3 is maintained substantially constant with respect to extremely slow variations that would otherwise occur due to aging, drift, and the like. For further details of an emission current regulator 11 suitable for use in practice of the present invention reference may be had to my copending application entitled "Emission Current Regulated Power Supply for Thermionic Element," Ser. No. 320,629, filed Nov. 11, 1963, now Patent No. 3,320,474 issued May 16, 1967 and assigned to the assignee herein. The emission current regulator of the aforementioned copending application includes elements corresponding to source 10 and variable resistance 13 that are illustrated in the drawing.

In accord with the present invention there is provided a subtraction network that can in its simplest form comprise two series connected resistances 15 and 16, at least one of which is advantageously selected to be variable. Input terminals 17 and 18 of the subtraction network are coupled to ion-collector electrode 8 and anode 6, respectively. Output terminal 19 of the subtraction network is conveniently coupled to an indicator 20 that provides an indication of the difference in magnitude between the unidirectional signals of opposite polarity applied to input terminals 17 and 18.

A positive electric signal corresponding in magnitude to, and preferably proportional to, the rate at which electrons are collected at anode 6 is conveniently applied to input terminal 18 by connecting terminal 18 to variable tap 14 of resistance 13. The positive voltage so obtained can then be used to balance the negative voltage, corresponding in magnitude to, and preferably proportional to, the rate at which ions are collected at ion collector 8, that is coupled to input terminal 17.

The subtraction network provides an output voltage equal to the difference in voltage between the absolute magnitude of the two signals applied to inputs 17 and 18. Accordingly, it is to be understood that the subtraction network is illustrated schematically in its simplest form as comprising two series resistances, however, other passive networks, for example, any of the plurality of well-known null-balance bridge networks, will serve equally advantageously in most cases as will active networks as differential amplifiers. Therefore, it is intended that these and other equivalent signal-balancing means be equally within the scope of the term "subtraction network" as used to describe and define the present invention.

The voltage corresponding in magnitude to the rate at which ions are collected at ion collector 8 is advantageously coupled to input terminal 17 through an electrometer amplifier that increases the strength of the signal present at external terminal 9 of ion collector 8. Electrometer amplifier 21 can take any of a plurality of specific forms, however, a particularly advantageous amplifier for use in accord with the present invention is disclosed in my copending application entitled, "Ion Gauge System Having Overload Protection," Ser. No. 379,633, filed July 1, 1964, now Patent No. 3,292,090 issued Dec. 13, 1966, and assigned to the assignee of the present invention. In addition, the emission current regulator described in this copending application is a suitable alternative to the emission current regulator 11 referred to above in the previously referenced copending application, Ser. No. 320,629, filed Nov. 11, 1963, now Patent No. 3,320,474 issued May 16, 1967.

In order to enhance the sensitivity of the system for leak detection, a direct current amplifier 22 is advantageously used to couple the output terminal 19 of the subtraction network to indicator 20, in which case indicator 20 provides an expanded scale indication. Further detailed description and discussion of expanded scale indication is to be found in my copending application entitled, "Expanded Scale Indicator for Electrometer," Ser. No. 379,486, filed July 1, 1964, and assigned to the assignee of the present invention. The present invention is advantageously practiced in accord with the system of the last-mentioned patent application by replacing the substantially constant source of bucking voltage therein with a bucking voltage derived from emission current and present across resistance 13 herein, for example.

In typical operation, resistance 16 is adjusted to approximately match the resistance of resistance 15 and tap 14 is adjusted to provide approximate equality in absolute magnitude of the voltages at terminals 17 and 18. Thereafter, resistance 16 is varied to provide a precise adjustment until the signal proportional to the emission current, which is supplied to input terminal 18, substantially cancels the signal proportional to ion current applied to input 17. This condition is indicated by cancellation of signals at output terminal 19 of the subtraction network as evidenced by zero indication of indicator 20.

Leaks within the associated vacuum system are then located by directing a stream of gas which is more or less readily ionizable than gas present within the enclosure over the external surfaces of the vacuum system. The presence of a leak in the vicinity where gas is directed is ascertained by a deflection of indicator 20. Of course, utilization means other than indicator 20 are appropriate in many cases including means for de-energizing a mechanically movable source of tracer gas upon advent of a leak. Such response is particularly desirable in systems wherein large vacuum devices are tested for leaks immediately prior to final sealing of the assembly.

It should be noted that the leak detection system described above not only serves to substantially eliminate flicker noise from the system but also compensates for other uncontrollable variations in electron emission, such as fluctuations due to intermittent energization of cathode 3 when regulator 11 is of the inexpensive type featuring a controllable duration of energization from a source of alternating current voltage. Thus, the present invention additionally permits an inexpensive system of the latter type to be utilized for leak detection without 60 cycle filters and the like. It should also be noted that the present invention is employed with equal advantage as a pressure monitor to detect failures in an evacuated system.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What I claim as new and desire to secure by Letters Patent of the United States is:

1. An ion gauge system comprising:
  (a) gas ionizing means disposed within a low pressure gas-filled enclosure and having externally energizable electrical elements inside said enclosure including a thermionic electron-emissive cathode, an electron-collecting anode, and an ion-collecting electrode, said cathode providing emission of electrons at a rate subject to uncontrollable variations that correspondingly effect uncontrollable variations in the rate at which ions are produced within said enclosure and are collected at said ion-collecting electrode;
  (b) a subtraction network having two input means coupled to said ion-collecting electrode and said electron-collecting anode, respectively, providing a difference signal of magnitude proportional to the difference in absolute magnitude between an electric signal proportional to the rate at which ions are collected at said ion-collecting electrode and a compensating signal corresponding in magnitude to the rate at which electrons are collected at said anode; and
  (c) indicator means coupled to said subtraction network providing an indication of the magnitude of said difference signal, said indicator means including a direct current amplifier effecting expanded scale indication.

2. An ion gauge system comprising:
  (a) gas ionization detection means disposed within a low pressure gas-filled enclosure and having externally energizable electrical elements including a thermionic electron-emissive cathode, an electron-collecting anode, and an ion-collecting electrode, said cathode providing emission of electrons at a rate subject to uncontrollable variations that correspondingly effect uncontrollable variations in the rate at which ions are produced within said enclosure and are collected at said ion-collecting electrode;

(b) a direct-current electrometer amplifier having input means coupled to said ion-collecting electrode and having output means providing an electrical output signal of magnitude corresponding to the rate at which ions are collected at said electrode;

(c) a subtraction network coupled to the output means of said electrometer amplifier and to said electron-collecting anode providing a difference signal of magnitude proportional to the difference in absolute magnitude between said electrical output signal and a compensating signal corresponding in magnitude to the rate at which electrons are collected at said anode; and (d) indicator means coupled to said subtraction network providing an indication of the magnitude of said difference signal.

3. The system of claim 2 wherein said subtraction network includes an output terminal and first and second circuit means coupling said terminal to said output means of said electrometer amplifier and to said anode respectively, said first and second circuit means being adjusted such that the absolute magnitude of said compensating signal appearing across said second circuit means, is substantially equal to the absolute magnitude of said output signal appearing across said first circuit means during normal circuit operation, whereby said uncontrollable variations are essentially cancelled from said difference signal.

4. The system of claim 3 wherein said indicator means includes a direct current amplifier effecting expanded scale indication.

5. An ion gauge system comprising:
(a) gas ionizing means disposed within a low pressure gas-filled enclosure and having externally energizable electrical elements including a thermionic electron-emissive cathode, an electron-collecting anode, and an ion-collecting electrode, said cathode providing emission of electrons at a rate subject to uncontrollable variations that correspondingly effect uncontrollable variations in the rate at which ions are produced within said enclosure and are collected at said ion-collecting electrode;

(b) a direct current electrometer amplifier having input means coupled to said ion-collecting electrode and having output means providing a negative polarity unidirectional electrical output signal of magnitude proportional to the rate at which ions are collected at said electrode;

(c) emission current regulator means connected to said cathode and said anode establishing an electron current circuit therebetween and providing a positive polarity unidirectional compensating electrical signal proportional in magnitude to the rate at which electrons are collected at said anode;

(d) a subtraction network having two input means coupled to the output means of said electrometer amplifier and to said emission current regulator means, respectively, providing a difference signal of magnitude proportional to the difference in absolute magnitude between said electrical output signal and said positive polarity unidirectional compensating signal; and, (e) indicator means coupled to said subtraction network providing an indication of the magnitude of said difference signal.

6. The system of claim 5 wherein said subtraction network includes an output terminal and first and second circuit means coupling said terminal to said output means of said electrometer amplifier and said emission current regulator respectively, said first and second circuit means being adjusted such that the absolute magnitude of said compensating signal appearing across said second circuit means is substantially equal to the absolute magnitude of said output signal appearing across said first circuit means during normal circuit operation, whereby said uncontrollable variations are essentially cancelled from said difference signal.

7. The system of claim 6 wherein said indicator means includes a direct current amplifier effecting expanded scale indication.

References Cited

UNITED STATES PATENTS

| 2,735,062 | 5/1956 | Striker | 324—33 |
| 2,814,018 | 11/1957 | Zemany | 324—33 |
| 3,070,992 | 1/1963 | Nemeth | 324—33 X |

OTHER REFERENCES

Dushman, Saul: "Scientific Foundations of Vacuum Technique," published by John Wiley & Sons, Inc., New York, 1949, pages 376–378 of 882 pages relied on.

RUDOLPH V. ROLINEC, Primary Examiner.

ARCHIE R. BORCHELT, Examiner.

C. F. ROBERTS, Assistant Examiner.